(12) United States Patent
Kremen

(10) Patent No.: US 7,457,017 B2
(45) Date of Patent: Nov. 25, 2008

(54) SCREENS TO BE USED WITH A SYSTEM FOR THE MAGNIFICATION AND PROJECTION OF IMAGES IN SUBSTANTIALLY THREE-DIMENSIONAL FORMAT

(76) Inventor: Stanley H. Kremen, 4 Lenape La., East Brunswick, NJ (US) 08816

( * ) Notice: Subject to any disclaimer, the term of this patent is extended or adjusted under 35 U.S.C. 154(b) by 0 days.

(21) Appl. No.: 10/416,689

(22) PCT Filed: May 10, 2002

(86) PCT No.: PCT/US02/14789

§ 371 (c)(1),
(2), (4) Date: May 10, 2003

(87) PCT Pub. No.: WO02/095678

PCT Pub. Date: Nov. 28, 2002

(65) Prior Publication Data

US 2004/0051921 A1     Mar. 18, 2004

Related U.S. Application Data

(63) Continuation-in-part of application No. 09/853,790, filed on May 11, 2001, now abandoned, which is a continuation-in-part of application No. 09/749,984, filed on Dec. 27, 2000, now Pat. No. 6,593,958, which is a continuation of application No. 09/111,990, filed on Jul. 8, 1998, now Pat. No. 6,229,562.

(60) Provisional application No. 60/051,972, filed on Jul. 8, 1997.

(51) Int. Cl.
*G02B 5/32* (2006.01)

(52) U.S. Cl. .......................... 359/20; 359/23; 359/458

(58) Field of Classification Search ............... 359/15, 359/19, 20, 23, 25, 26, 619, 621, 622, 458; 396/330
See application file for complete search history.

(56) References Cited

U.S. PATENT DOCUMENTS

| | | | | |
|---|---|---|---|---|
| 3,715,154 A | * | 2/1973 | Bestenreiner | 352/61 |
| 4,130,337 A | * | 12/1978 | Okoshi | 359/23 |
| 4,421,380 A | | 12/1983 | McGrew | |
| 4,878,735 A | * | 11/1989 | Vilums | 359/462 |
| 5,973,807 A | | 10/1999 | Buchkremer et al. | |

* cited by examiner

*Primary Examiner*—Alessandro Amari

(57) ABSTRACT

The three-dimensional system discloses screens (12, 16) that produce magnified three-dimensional images (6) that can be projected before large audiences who can view said images without special glasses or viewing aids. The screens disclosed therein are active optical systems which, together with the projection optics, serve to reconstruct and present to the audience the same light waves as though the three-dimensional scene actually exists. The present invention discloses improved screens for this system as well as methods of manufacturing said improved screens.

85 Claims, 15 Drawing Sheets

REAR SURFACE

FRONT SURFACE

REAR SURFACE

FRONT SURFACE

CROSS SECTIONAL TOP VIEW

FRONT VIEW

SCREENS TO BE USED WITH A SYSTEM FOR THE MAGNIFICATION AND PROJECTION OF IMAGES IN SUBSTANTIALLY THREE-DIMENSIONAL FORMAT

CROSS REFERENCE TO RELATED APPLICATIONS

This application is the a U.S. Non-Provisional National Stage Application, filed in accordance with 35 USC §371, that is a U.S. counterpart and claims priority of PCT Application Ser. No. PCT/US 02/014789 filed on May 10, 2002, still pending and published by the European Patent Office as Publication No. WO 02/095678 on Nov. 28, 2002, said PCT Application being a continuation-in-part and claiming the benefit and priority of U.S. non-provisional application Ser. No. 09/853,790 filed on May 11, 2001, still pending, which in turn is a continuation-in-part and claims the benefit of U.S. non-provisional application Ser. No. 09/749,984 filed Dec. 27, 2000, now U.S. Pat. No. 6,593,958 which in turn is a continuation of and claims the benefit of non-provisional application Ser. No. 09/111,990 filed Jul. 8, 1998, now U.S. Pat. No. 6,229,562 granted on May 8, 2001 (hereinafter the '562 patent), which in turn claims the benefit of U.S. Provisional Application Ser. No. 60/051,972 filed Jul. 8, 1997. The foregoing PCT application, PCT publication, the U.S. provisional and non-provisional applications, and the U.S. patent are incorporated by reference in their entirety herein.

BACKGROUND

1. Field of the Invention

The technical field to which the invention relates is the method and apparatus for making and projecting magnified three-dimensional images recorded via the principles of holography and/or integral photography.

2. Background of the Invention

The artistic and photographic rendering of three-dimensional images is not new. During the late nineteenth century, commercial stereoscopes became very popular toys and novelties. These devices employed the principle of stereoscopy. Most people see with two eyes. When a person opens only one eye, he sees a two-dimensional image of a life-scene from a particular from slightly different view points. When both eyes are open, the individual's mind merges the two images and acquires depth information. Therefore, both eyes are needed to enable the mind to perceive a three-dimensional scene. The principle of stereoscopy tricks a person into perceiving depth by presenting each of his eyes with separated pictures representing a given scene from slightly different view points. If the distance between the view points is approximately equal to the distance between his eyes, he will see the scene in full three-dimensions.

Over the years, a number of stereoscopic devices were invented to enable people to view three-dimensional scenes. The first scenes were reconstructed from pairs of drawings of the same scene. The two drawings were only slightly different, and were drawn as geometric projections of the same object or scene from a slightly different perspective. Eventually, stereoscopic cameras were invented that would produce photographs that would enable three-dimensional reconstruction of a photographed scene. These cameras normally have two lenses situated a distance apart equal to the interocular separation. The camera normally takes two stereo paired photographs of the same scene with a single exposure. When these photographs are developed and viewed with an appropriate viewing device, a three-dimensional picture is perceived.

First, people were able to purchase various types of stereoscopes for viewing these pictures. Then, during the earlier part of the twentieth century, lenticular stereograms became available. These are integrated photographs (or drawings) for which no external viewing device is necessary to be able to perceive a three dimensional image. A stereogram employs a lenticular sheet comprised of small parallel cylindrical lenses. This cylindrical lenticular sheet is often called a Bonnet Screen. To prepare a stereogram, first a stereo pair of pictures are produced of the scene. These stereo pairs are exposed separately, but from slightly different angles, on a photographic film through a Bonnet Screen. After development, a viewer looking at the photograph through a Bonnet Screen sees each of the two stereo pairs reconstructed at the same angles at which they were exposed. Therefore, the two two-dimensional pictures are separated so that they are each seen by the viewer individually with each eye. Because of this, the viewer perceives a three-dimensional scene. The lenticular stereogram was the first device available wherein the stereo paired pictures were integrated into the same frame. Photographs designed for viewing with a stereoscope are individually viewable as two-dimensional pictures when the stereoscope is not in use. However, the lenticular stereogram, when viewed without the Bonnet Screen, is a very confusing picture.

Two additional processes were developed that integrated the stereo paired pictures into the same frame—the anaglyph and the vectograph. The anaglyph permitted two black-and-white stereo paired pictures to be exposed on color film—one picture being exposed using a red filter and the other exposed using a blue or green filter. When viewed with special glasses, one lens being colored red and the other colored blue (or green), a three-dimensional scene is perceived. The vectograph permitted two stereo paired pictures to be exposed on a film with an emulsion on both sides—one picture being exposed on one side of the film and the other picture being exposed on the other side of the film. The two pictures are developed such that light passing through one is polarized in one direction while light passing through the other is polarized in the other direction. This permits a viewer to use special glasses consisting of Polaroid filters to see the three-dimensional scene. Vectography has the advantage over anaglyphic photography that avoids the annoyance of seeing the red-blue tint in the scene. Anaglyphic and vectographic slides (transparencies that could be viewed in a slide projector) were widely sold. This resulted in an audience being able to view a magnified three-dimensional scene on a screen.

Eventually, anaglyphic motion pictures were displayed in theaters and ultimately on television. They were never popular as audiences found the red-blue tints very annoying. The process was refined for television to permit viewing of full color movies in three-dimensions. However, use of the red and blue glasses still produced the annoying red-blue tint. Movies employing this process were broadcast on television as late as the mid-1980's.

Vectography was never used in the cinema, but a process called "3-D" was used to produce motion pictures. This process enjoyed reasonable popularity during the 1950's. It employed a special projector with two lenses that projected each of the two stereo pairs onto an aluminized screen. Each stereo pair had a different polarity such that when a viewer used special Polaroid viewing glasses he would see a different picture with each eye. Since Polaroid filters are untinted, the 3-D movies could be viewed in full color. However, the popularity of 3-D movies eventually waned. The process is occasionally revived in present day movies, but it remains unpopular. Audiences often experienced eye strain and headaches while watching these films. They erroneously blamed this on being required to wear special glasses.

Several attempts were made to create stereoscopic motion pictures that could be viewed as three-dimensional scenes without glasses. In 1969, Dennis Gabor, inventor of the hologram, developed a process wherein a stereoscopic movie could be viewed by the unaided eye using a special screen. This process was never implemented. Had these movies been produced, the process would have required viewers to keep their heads in relatively fixed positions.

It is interesting that most people blamed the eye strain and headaches resulting from viewing 3-D movies on the glasses. One-half of all Americans wear glasses and are not bothered by them. However, the use of glasses was the only thing that appeared different to audiences, and therefore, must have caused the problem. However, the problem was actually caused by a basic problem inherent in the process of stereoscopy. When someone observes a real object, his eyes both converge and focus on the object at the same time. However, when he observes a stereo pair, his eyes converge on the apparent position of the object but focus on the screen or picture focal plane. A condition where one's eyes converge and focus at different positions is an unnatural viewing condition. The result is eye strain. All stereoscopic processes have this problem. It cannot be avoided.

Dennis Gabor invented the hologram in 1948, and in 1964, Emmet Leith and Juris Upatnicks made holography practical for the production of three-dimensional images. Holography produces three-dimensional images using a principle different from stereoscopy. In order to understand what holography is, one must first understand the concept of interference. If a small pebble is thrown into a still pool of water, waves are generated, traveling as circles away from the point of origin. A second pebble thrown into the water will generate a new set of waves. When these two waves meet, a new wave pattern is set up in the water, resulting from the interference of the two original waves. Light is also a wave-like phenomenon. Two intersecting light beams will similarly interfere to generate a resulting wave pattern. Were the two light beams to interact at the surface of a photographic plate, the interference pattern would then be photographed. Such a photograph is called an interferogram.

A hologram is a special type of interferogram. In order to produce a hologram, one of the interfering light waves must have an identifiable wavefront which can be easily reproduced or regenerated. This is called the reference beam. The second light wave is generally more complex, and is usually characteristic of the wavefront reflected from some object or scene. This is called the object beam. If, after the resulting interferogram is developed, were it to be illuminated by a wavefront identical to the reference beam, the object wavefront would be reconstructed. In other words, were a viewer to look into the direction where the object was originally, he would observe the object wavefront. He would see the object before him in three-dimensions with such reality that it would be impossible for him to determine visually whether or not the object really exists. An interferogram of this type is called a hologram. The hologram is not a photograph of the object, but rather of the interference pattern containing all the information about the object. It should be noted that no lenses need be used in making holograms. Of course, more than one object beam can be used, and all of these wavefronts will be reconstructed simultaneously by a single reference beam. Because the hologram is not a photograph of this scene, but rather a visual reconstruction of the objects in space as they existed at the time the hologram was taken, the viewer can observe the scene as he would were it to really exist. If one object blocks another, the viewer merely looks around it as he would ordinarily, and, behold, the hidden object becomes visible. Holography, therefore, provides a stark reality that no other three-dimensional process can produce.

Integral photography is a photographic technique of producing three-dimensional photographs by an integration process from many two-dimensional photographs each taken of the same object and event but at a slightly different viewing angle. In order to recreate the three-dimensional effect from all these two-dimensional photographs, a wavefront represented by the composite of all these elemental photographs is reconstructed after development, and this wavefront is similar to the wavefront produced by the three-dimensional scene itself provided that the integral photograph is viewed at a sufficient distance away. In fact, were the viewer to be positioned sufficiently far away as not to be able to resolve the individual elements in the photograph (i.e., at minimum visual acuity), he would be unable to distinguish the wavefront reconstructed from the integral photograph from that produced by the actual scene. The viewer would observe the scene in true three-dimensions. Unlike stereoscopic three-dimensionality, no special device need by worn by the viewer, and the illusion of depth of the scene in integral photography does not have to be created in the mind of the viewer; the three-dimensional images actually exist in space. A hologram is a photograph which is capable of reconstructing the same wavefront as would be created by the actual scene. In fact, were the hologram to be properly illuminated, it would not be possible for the viewer to perform any visual test to determine whether or not the objects in the scene were real. Were one to view the hologram through a small aperture, the entire scene would be visible. Moving the aperture around only changes the viewing angle. No matter how small the aperture is (within reason—limited by a size somewhat larger than the grain of the film) the entire scene would still be visible. A hologram can, then, be thought of as an integral photograph whose elemental photographs are of infinitesimal size. Therefore, an integral photograph can be though of as being equivalent to a hologram when the viewer is positioned at minimum visual acuity.

Projection of magnified three-dimensional scenes from holograms or integral photographs before large audiences has never been implemented. First, if one were to project a hologram onto a conventional screen, no image of the scene would be produced. Since a hologram is a photograph that contains information about an object and not of the object itself, a hologram projected onto a screen as a magnified photograph would not be seen as anything meaningful. On the other hand, if one were to produce a large magnified hologram so as to enable viewing before a large audience, the principles of holography dictate that the reconstructed three-dimensional image would be de-magnified. Second, there is a basic principle governing the magnification of three-dimensional images. If the three-dimensional image itself were to be magnified, the magnification in depth would be equal to the square of the lateral magnification. Such an image would not be viewable as a natural three-dimensional object. Finally, a number of engineering difficulties exist in the current state-of-the-art that have made projection of magnified three-dimensional scenes before large audiences impractical.

SUMMARY OF THE INVENTION

The screens disclosed as several embodiments herein are designed to be used with a system for magnifying and projecting three-dimensional images. Such a system can be used either for still life images, motion pictures, or live action scenes. Three-dimensional still life images produced by this process are useful in the scientific, medical, advertising, and artistic fields of endeavor. They are viewable by spectators without any special viewing aids. Three-dimensional magnification of live action scenes produced by this process is useful for live concerts and stage productions before large audiences. However, the primary use envisioned for this invention is the production and display of three-dimensional movies that can be seen in cinemas by large audiences. These motion pictures will possess a realism never before experienced in the history of the cinema.

BRIEF DESCRIPTION OF THE DRAWINGS

FIG. 6 illustrates color filters that are used with the screens.

DETAILED DESCRIPTION OF THE PREFERRED AND ALTERNATE EMBODIMENTS 1.0 The Method of Magnification and Projection In the '562 patent, the inventor presented a solution to the problem of projecting magnified three-dimensional scenes before large audiences. The solution requires the three-dimensional image prior to magnification to be rendered as an array of two-dimensional images by some form of matrix lens array, such as a fly's eye lens. Were this array of two-dimensional images to be magnified by some magnification factor, and then viewed or projected through a new matrix lens array that has been scaled up from the lens array that produced the original array of two-dimensional images, such that the scaling factor is equal to the magnification (i.e., the focal length and diameter of each lenslet must be multiplied by the same magnification factor), a new three-dimensional image would be produced that would be magnified by the same magnification factor, and all image dimensions would be magnified by the same factor such that all dimensions of the final three-dimensional image would be proportional to the dimensions of the original image. The utility of magnifying three-dimensional images using this method would be the ability to enlarge holograms or integral photographs or other media from which three-dimensional images are produced, or to project still or moving three-dimensional images before a large audience.

Figure 1:
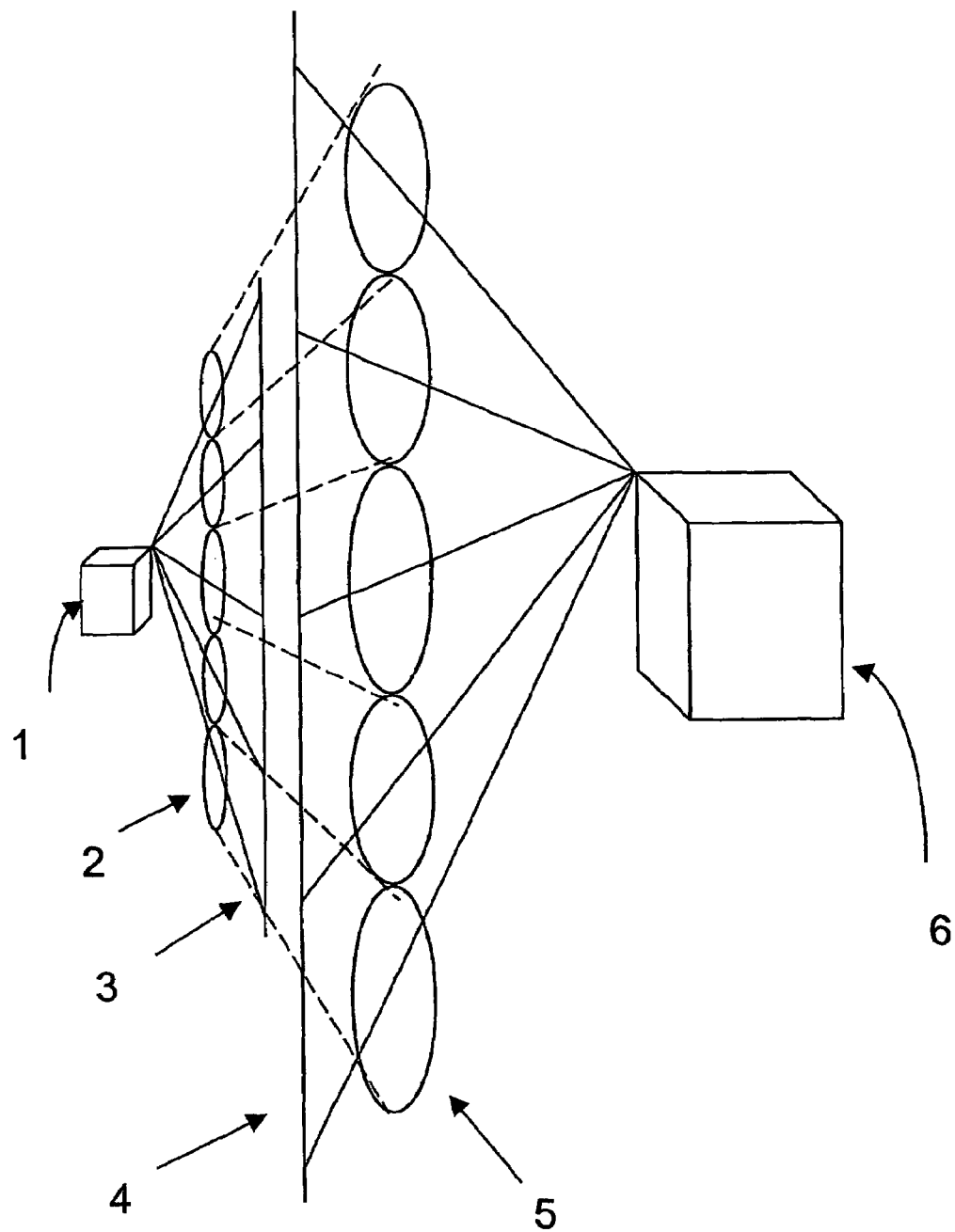
FIG. 1 illustrates the method of magnification that is the basis for this application.

The magnification principle is illustrated in FIG. 1. Object 1 is photographed by matrix lens array 2, thereby producing integral photograph 3. Integral photograph 3 is then magnified to give integral photograph 4 which is then placed behind matrix lens array 5. This combination yields magnified image 6. It must be noted here, that during scaling-up, the (F/#) of the lenslets remains constant.

Figure 2:
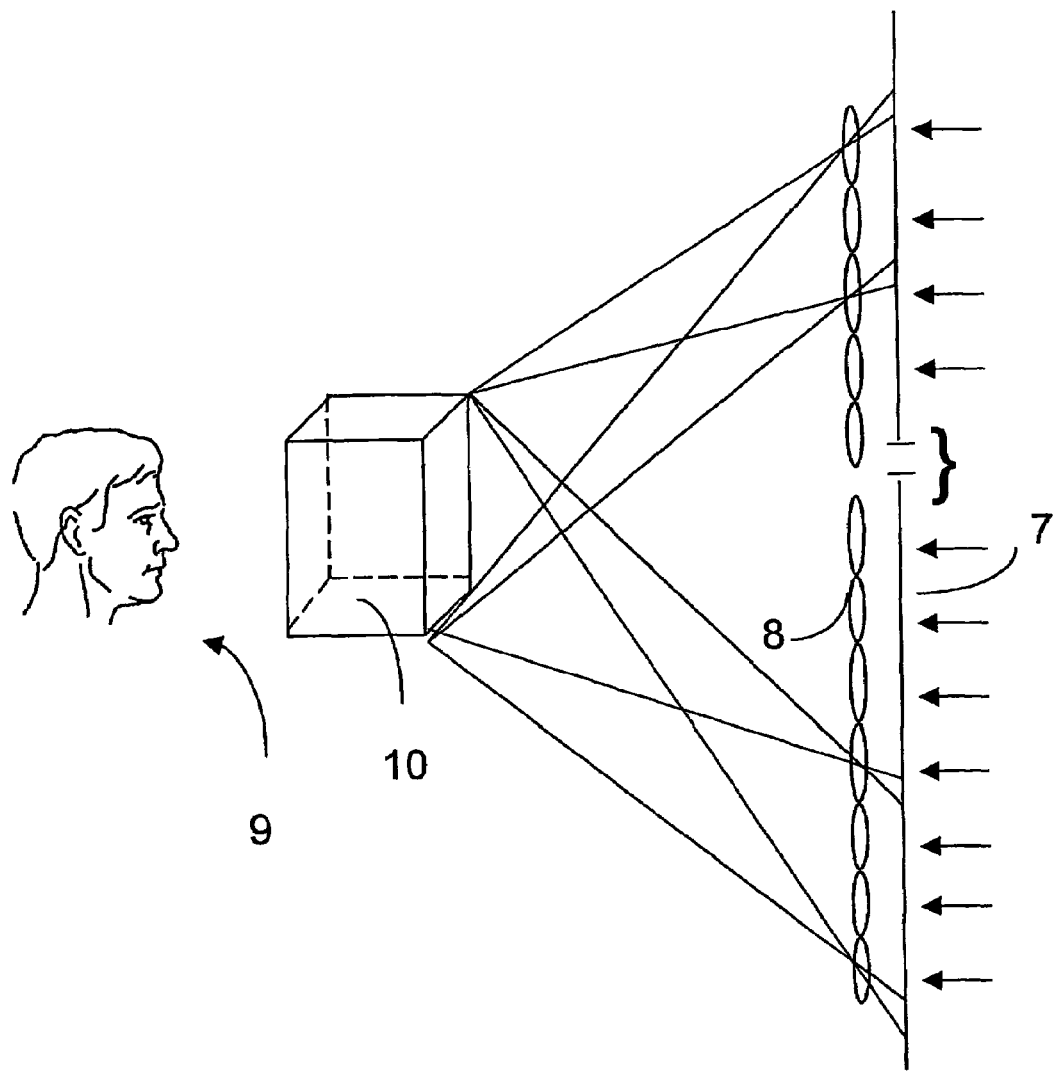
FIG. 2 illustrates how a magnified image can be projected before an audience.

Projection is merely another form of magnification. The only difference lies in the fact that no permanent record is produced as in photography. To illustrate the principle of projection, let us use as an example, the technique of rear projection shown in FIG. 2. (As will be seen later, it is also possible to illustrate this principle with front projection.) Were an integral photographic transparency to be projected at some given magnification onto a translucent screen 7 which is behind a large matrix lens array 8, an observer 9 in the audience sitting in front of the matrix lens array will see the magnified three-dimensional image 10. The three-dimensional image can be made orthoscopic, and can be made to appear either in front of or behind the matrix lens array. This was discussed in the '562 patent, and is not relevant to this present application.

Figure 3:
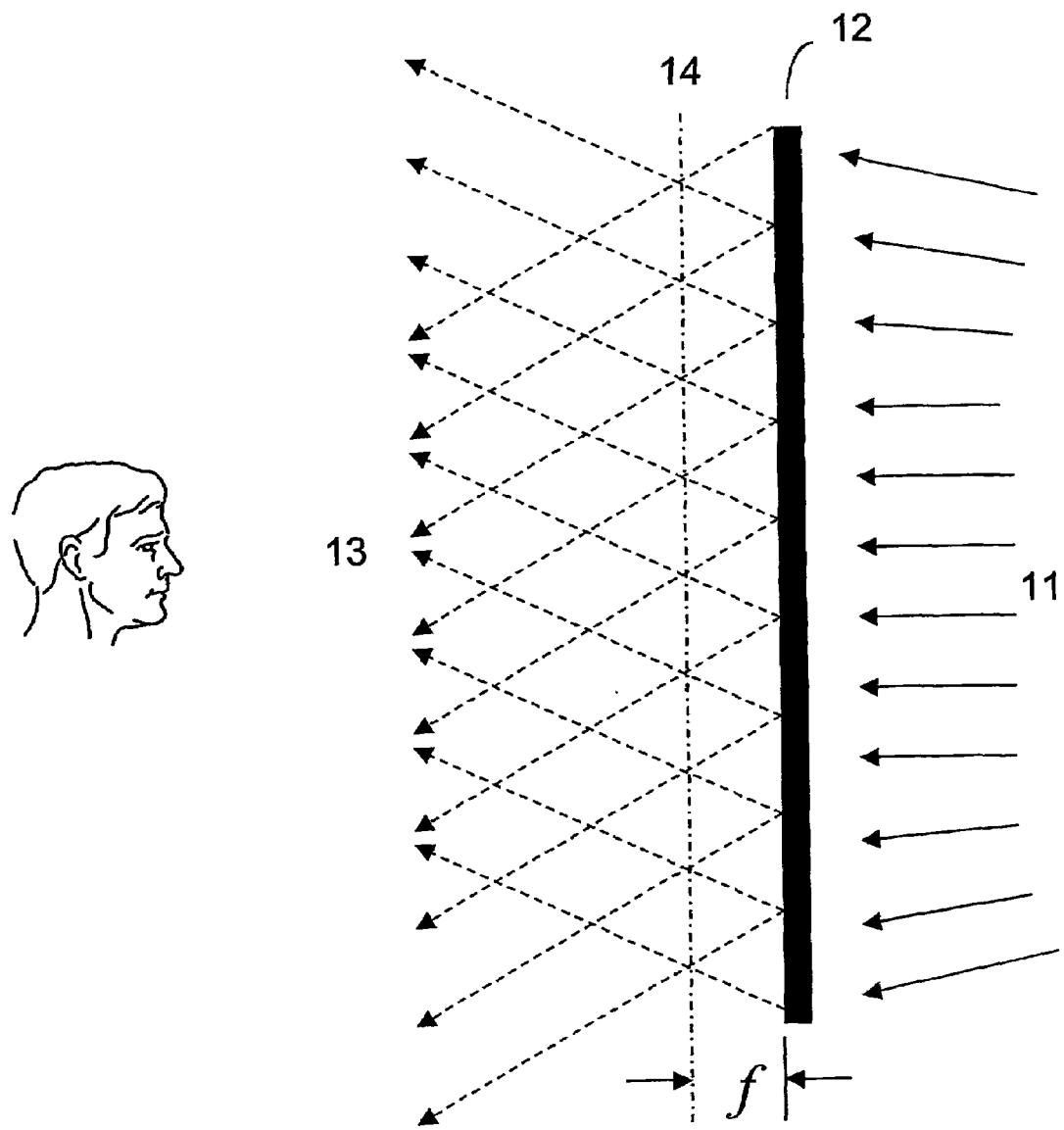
FIG. 3 illustrates the method of rear projection.
Figure 4:
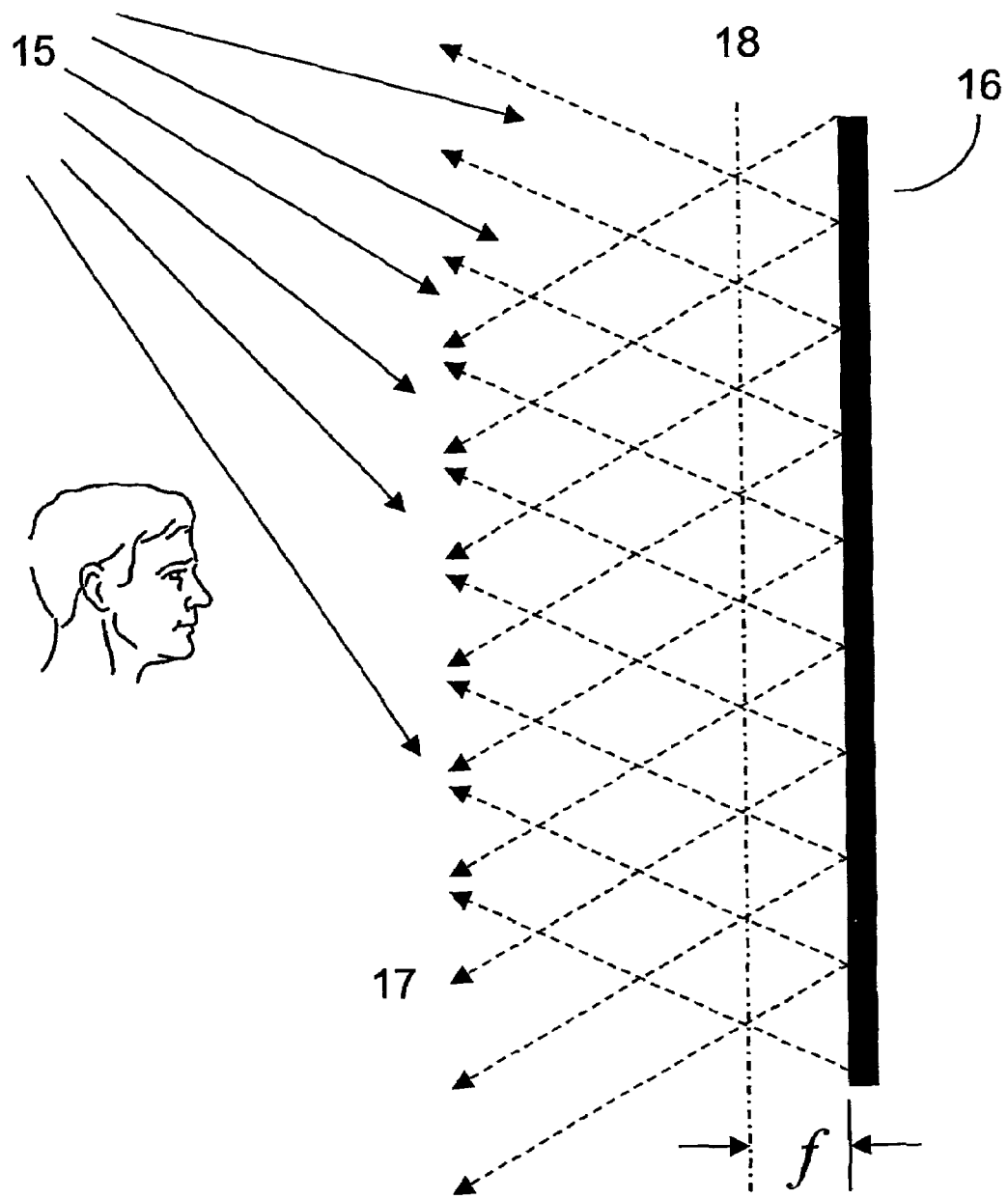
FIG. 4 illustrates the method of front projection.

The basic principle of operation of a rear projection screen for this process is shown in FIG. 3. Light 11 emanating from a projector impinges upon the rear of screen 12 and passes through said screen as light 13. Said light 13 is focused by the active optical system of screen 12 as a plurality of points at focal plane 14 which is a distance f in front of screen 12. In contrast to this, the basic principle of operation of a front projection screen for this process is shown in FIG. 4. Light 15 emanating from a projector impinges upon the front of screen 16 and reflects off said screen as light 17. Said light 17 is focused by the active optical system of screen 16 as a plurality of points at focal plane 18 which is a distance f in front of screen 16. The subject of this invention is front projection screens that reconstructs a three-dimensional image from a projected two-dimensional integral photograph.

Figure 5:
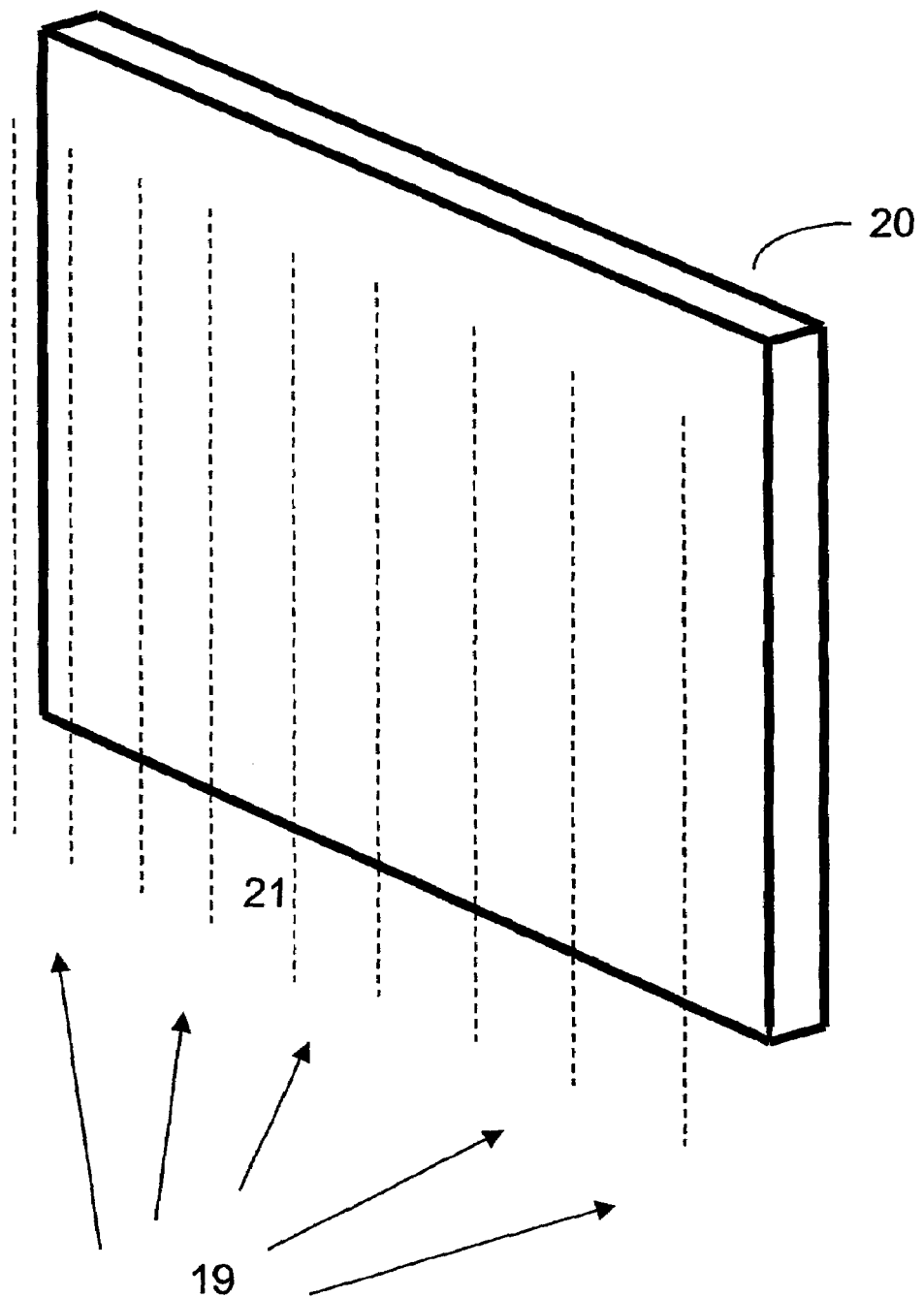
FIG. 5 illustrates the function of a front projection screen designed to reconstruct three-dimensional images without vertical parallax by reconstructing vertical lines in space at the focal plane of the screen.

As was disclosed in the '562 patent, it is a desirable embodiment to magnify and project three-dimensional images without the use of vertical parallax. FIG. 5 illustrates how this can be done using a front projection screen. Instead of the screen's active optical system focusing light impinging on the screen as a rectangular matrix of points in front of the screen onto its focal plane, said active optical system focuses the light as a series of vertical lines in front of the screen onto its focal plane. In the figure, light 19 emanating from a projector (not shown) impinges upon screen 20 which focuses said light 19 as a plurality of parallel vertical lines onto the focal plane of the screen.

Figure 6A:
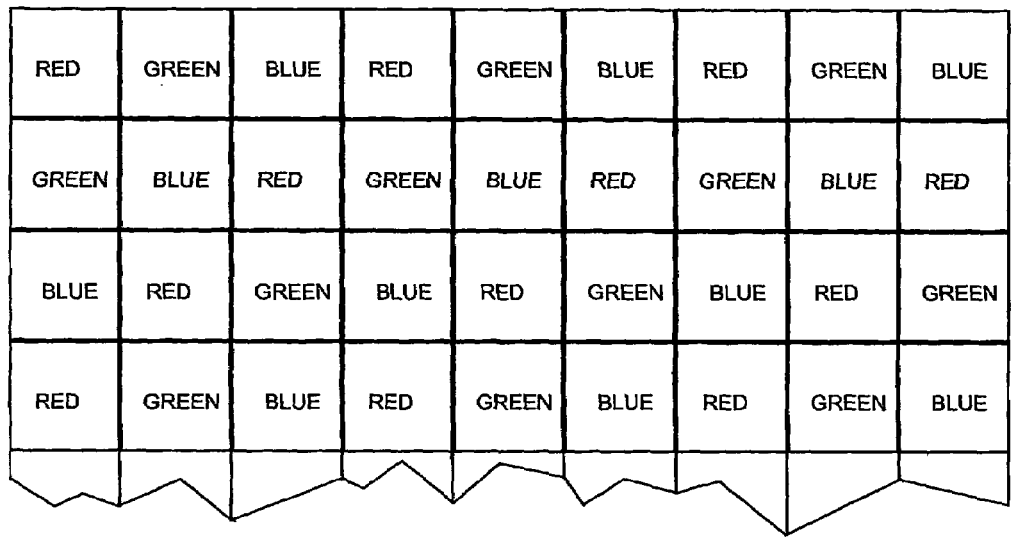
FIG. 6(a) is a schematic of a rectangular matrix color filter array that is used with a screen that is a rectangular matrix lens array.
Figure 6B:
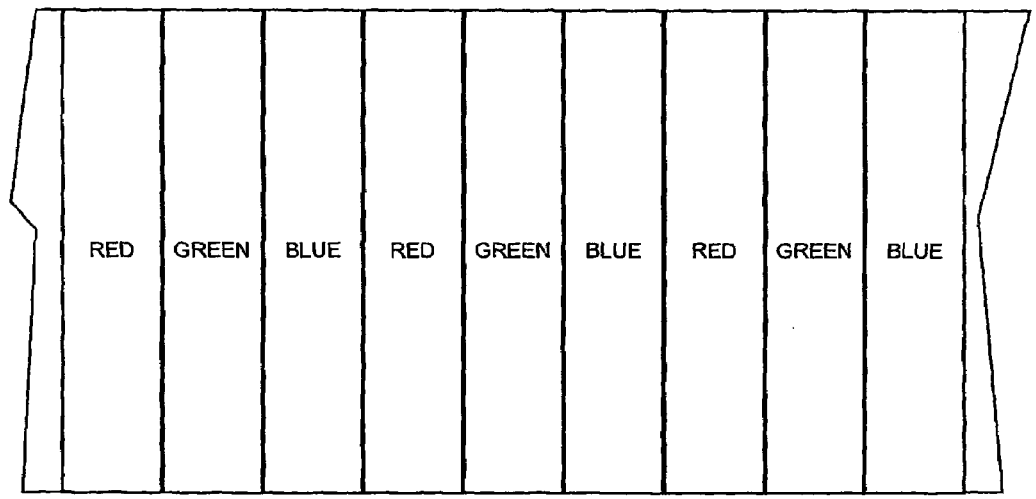
FIG. 6(b) is a schematic of an alternating color vertical strip array that is used with a screen that reconstructs three-dimensional images without vertical parallax.
Figure 7:
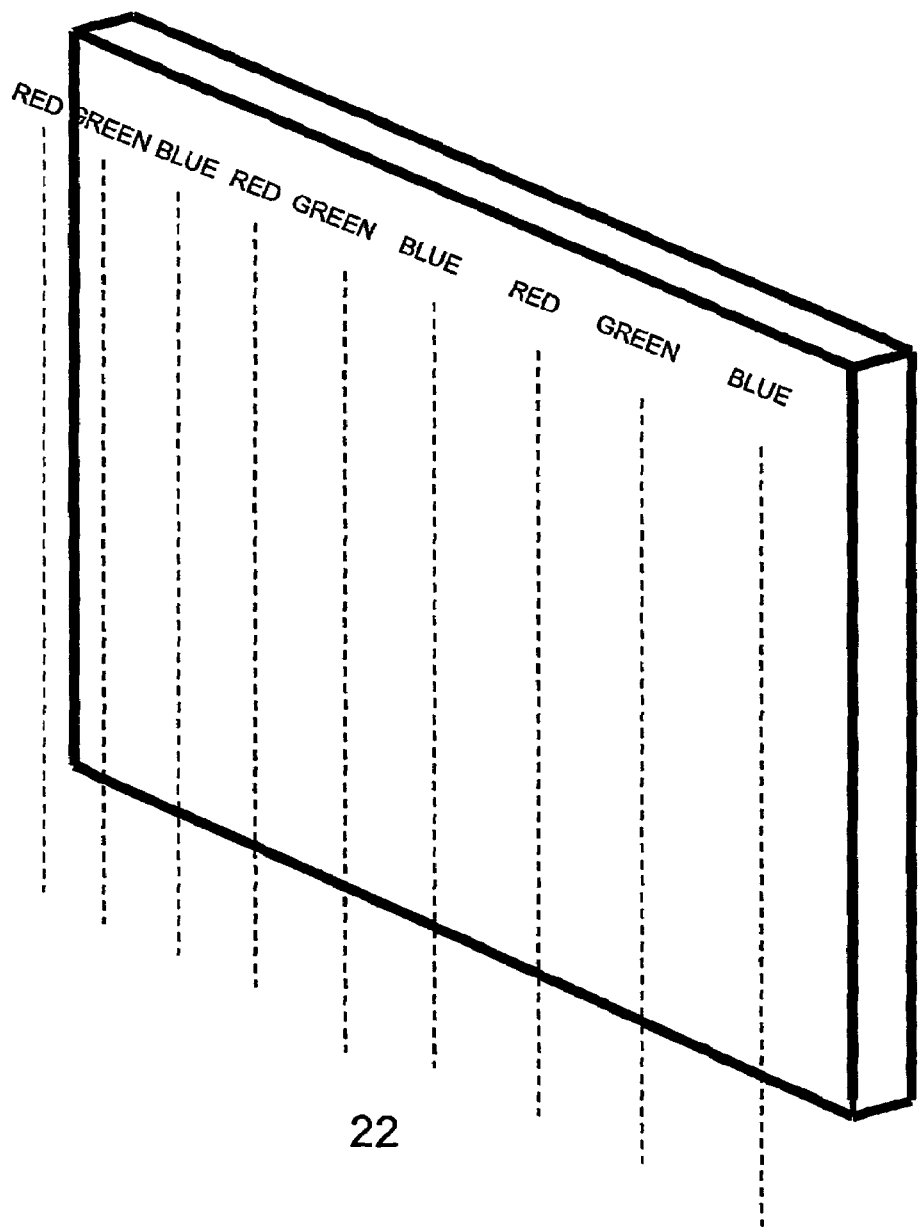
FIG. 7 illustrates how a front projection screen designed to reconstruct three-dimensional images without vertical parallax reconstructs alternating colored vertical lines in space at the focal plane of the screen.

As was further disclosed in the '562 patent, it is also a desirable embodiment to project black and white images onto the screen, said black and white images produced by using a color filter during photography, and to reconstruct full color three-dimensional reconstructions therefrom. Where both horizontal and vertical parallax are to be present, a color filter of the type shown in FIG. 6(a) is used to photograph the scenes along with the matrix lens array that comprises the first active optical system. This type of color filter is comprised of alternating color swatches that filter the light onto black and white film. In the figure, a square matrix array is shown using the alternating three primary additive colors red, green, and blue. However, the swatches can be any shape that can fit together in a massive array, such as hexagonally close packed, and the colors can be any primary colors that together would produce white. One can use three primary subtractive colors such as cyan, magenta, and yellow. Furthermore, one can use a two color system consisting of alternating additive and subtractive primary colors, such as red and cyan. Where only vertical parallax is present, a color filter of the type shown in FIG. 6(b) is used to photograph the scenes along with the linear array of cylindrical lenses that comprises the first active optical system. In the figure, filter strips of the alternating primary additive colors red, green, and blue are shown, but any primary colors combining to produce white light can be used, as can the subtractive colors, as can the two color system discussed above. To reconstruct full color images from monochromatic images photographed with color filters, a plurality of alternating monochromatic focused points must be produced by the screen. The alternating color pattern of the screen must be the same as the alternating color pattern of the color filters used during photography. FIG. 7 shows how this might appear in a screen where vertical parallax is absent. In FIG. 7, the focused lines of light 22 alternate as monochromatic red, green, and blue lines, but these colors can vary as discussed above.

2.0 The Bragg Angle Holographic Screen (The First Embodiment)

The preferred embodiment of the screen is an array of cylindrical zone plates with associated color filtration. Zone plates can be produced holographically. However, instead of being produced as transmission holograms, they are produced as reflection holograms. Reflection holograms are commonly manufactured by a process called Bragg-Angle Holography. In this instance, instead of the diffraction pattern being formed on the surface of the photographic emulsion which makes up the hologram, the diffraction pattern is formed in the volume of the emulsion itself. Such a holographic zone plate would have the following advantages:

(1) Since it is formed as a reflection hologram, this type of screen is applicable to front projection, the technique now in use in most theaters.

(2) A reflection holographic screen accepts white light emanating from a point source and reflects it into the audience at the wavelength with which the hologram was initially made. Since the zone plate screen consists of a mosaic of alternating zone plates, each one produced as a hologram by laser light having a different wavelength, it is apparent that a holographic screen of this type is capable of producing vertical lines of alternating colors as is shown in FIG. 7. Separate color filtration or synthesis is not required.

The screen is a Bragg Angle Reflection Hologram, which when illuminated from the front with a beam of white light having a spherical wavefront, the reconstruction will be a series of thin vertical lines, each line a different color, the colors alternating between red, green and blue, each line projected in front of the screen a distance f, and the vertical lines will be arranged horizontally across the width of the screen. A Bragg Angle Hologram is really a diffraction grating whose diffracting elements are distributed throughout the volume of the emulsion. A reconstruction can only be obtained by a reference beam of the same wavelength as was used to make the hologram. For this wavelength, the reconstruction efficiency is extremely high. If a white light reference beam is used, only the appropriate color component will be selected to perform the reconstruction.

Figure 8A:
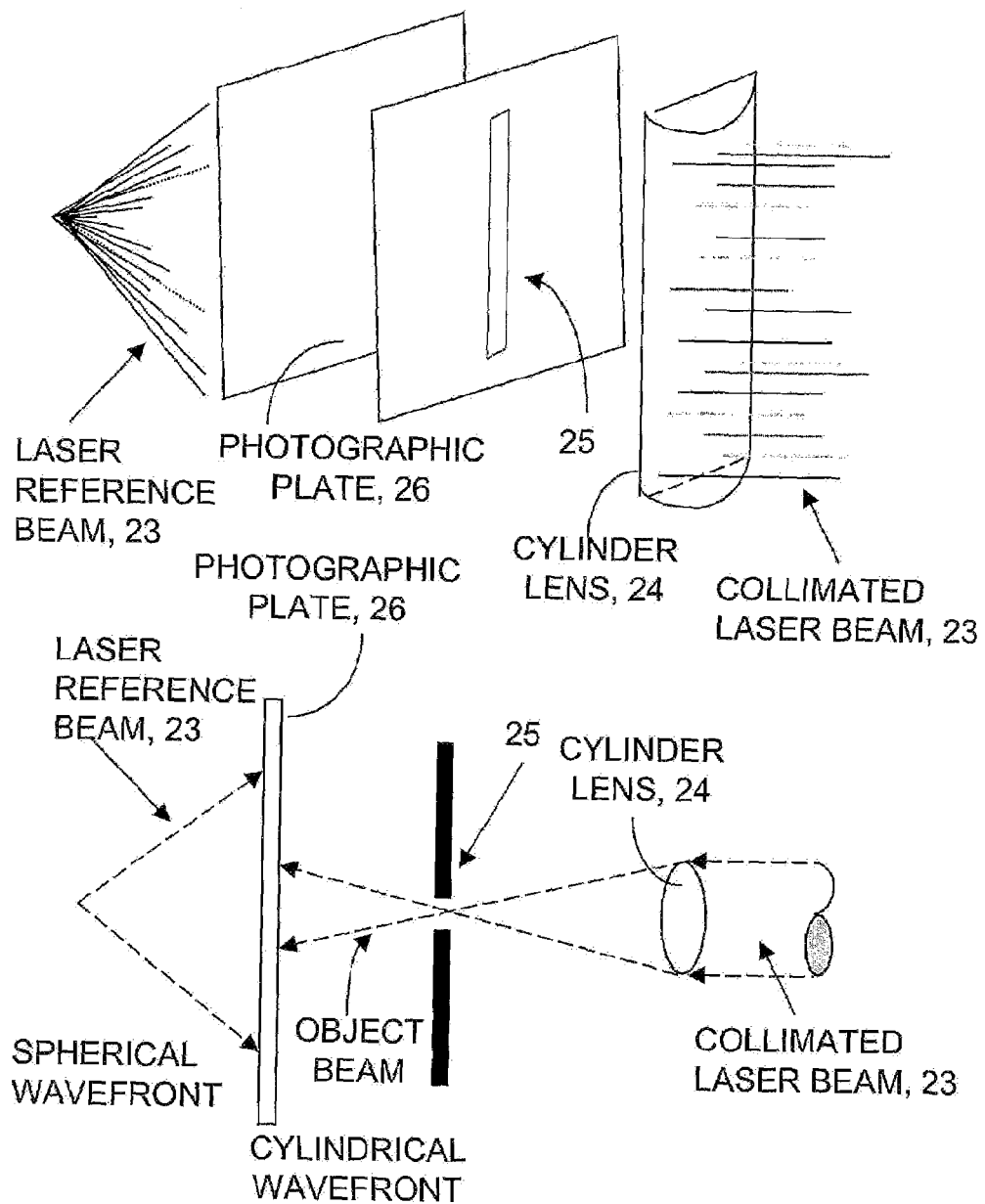
FIG. 8 shows the process for formation or manufacture of the front projection Bragg Angle holographic screen.
Figure 8B:
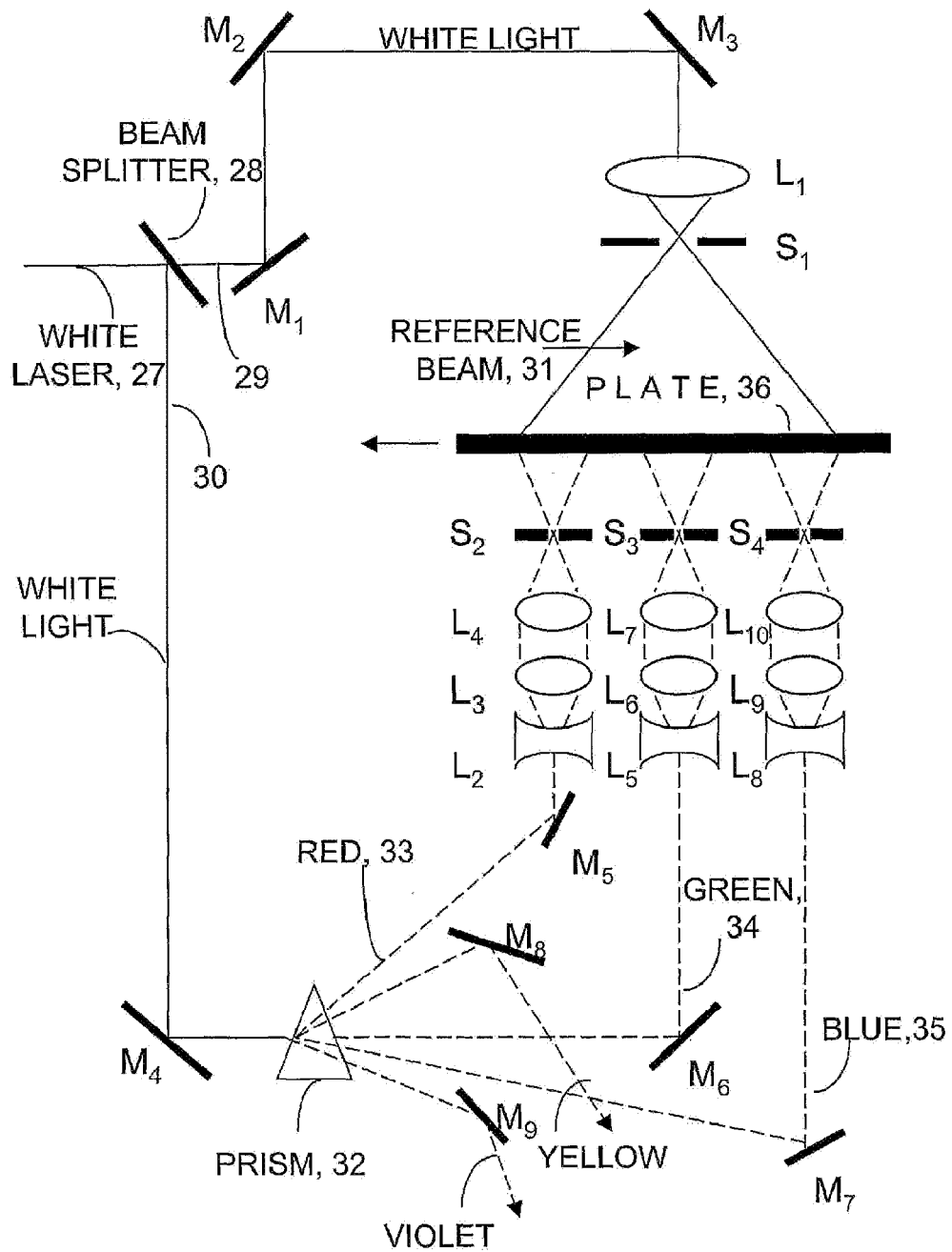
Figure 9:
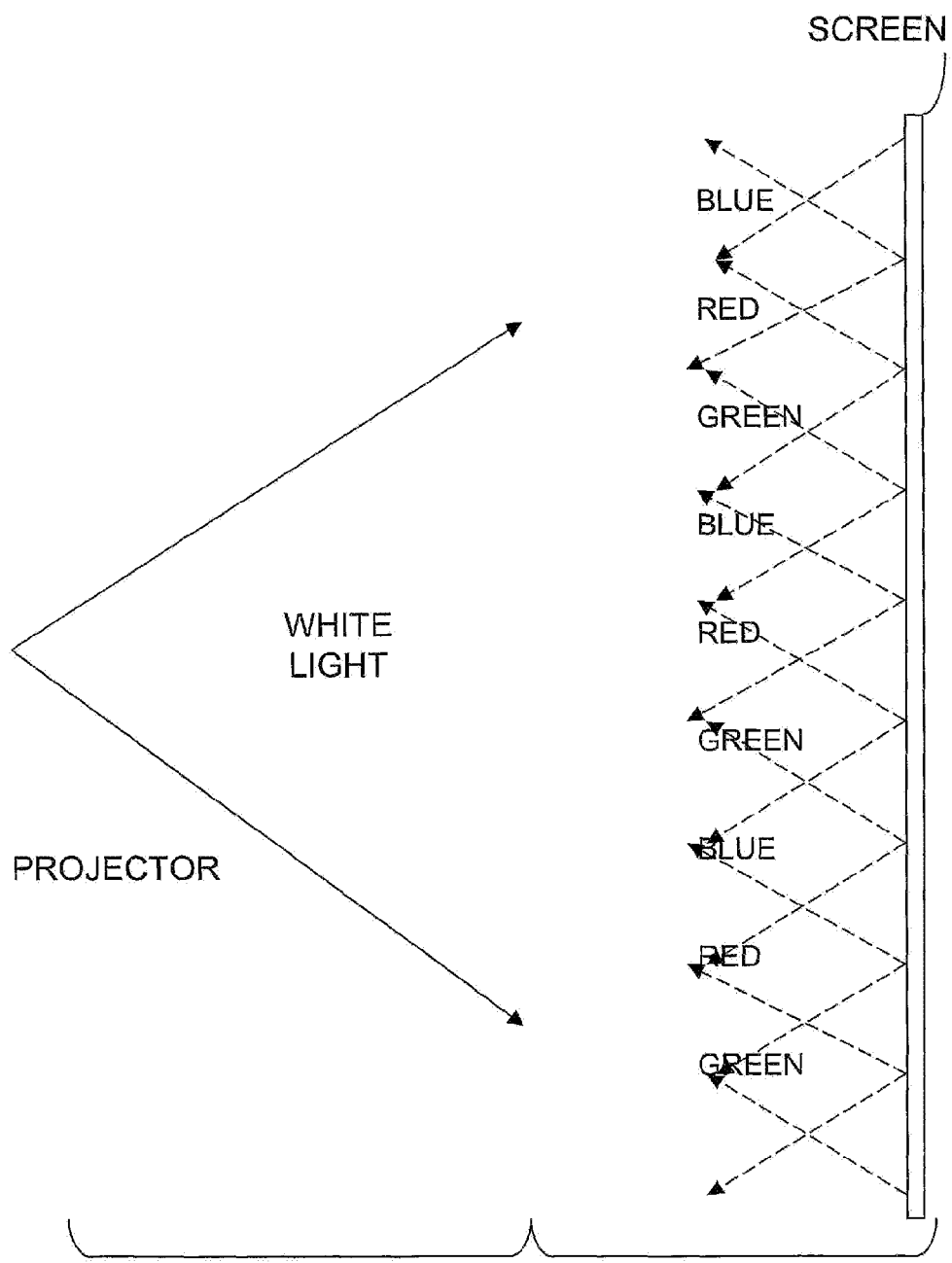
FIG. 9 shows the method of reconstruction from projection onto the front projection holographic screen.

FIG. 8(a) shows the fabrication of a reflection hologram with monochromatic light. The reference beam is a spherical wavefront and the reconstruction is a real image of a single vertical line projected in front of the hologram. The object beam is created by passing a laser beam 23 through a cylindrical lens 24 which focuses through a slit 25 positioned at a distance f from the photographic plate 26. The reference beam is produced as a spherical wavefront from the same laser 23, and is made to impinge upon the opposite side of the photographic plate 26. This operation can be performed separately for each wavelength needed, or the hologram can be fabricated as shown in FIG. 8(b). A white light, or multi-wavelength laser 27, such as a krypton laser, is used. The complete beam having all color components is used as the reference beam 31. The laser beam is split in two using a beam splitter 28 into two components 29 and 30. Beam 29 ultimately becomes the reference beam 31 after passing the optical components (mirrors $M_1$, $M_2$ and $M_3$, and concave lens $L_1$ and circular aperture $S_1$). Beam 30 ultimately becomes the object beams. First, the color components are separated by a prism 32. The unwanted wavelength components are removed by mirrors $M_0$ and $M_3$ leaving only the three red 33, green 34 and blue 35 object beams to be used to create the hologram. (Of course, colors other than red, green and blue can be used as long as they are complementary colors which are used to form white.) Thus far only three zone plates have been created on the photographic plate 36. The photographic plate 36 is then moved, and a new section is exposed in exactly the same manner. The method of reconstruction is shown in FIG. 9. A white light reference beam with a spherical wavefront is used to reconstruct alternating red, green and blue cylindrical wavefronts. Should the reference beam emanate from a projector in the rear of the theater with the image of an integral photograph impressed on the beam such that the image of the integral photograph is focused onto the screen, then a 3-dimensional image will be reconstructed from the integral photograph. In this case, a color filtration or color synthesis is not required, as the image will be properly broken down into the appropriate color pattern, and black & white film must be used.

The screen need not be prepared as an extremely large hologram, as this would be impractical. Even in a very small theater, the screen size might be 20 feet wide×10 feet high. The mechanics of producing a hologram that large is formidable. Instead, smaller rectangular shaped tiles can be produced which are all identical. These tiles can then be assembled to produce a screen of any size.

Clearly, the tiles needed to produce a screen of one size might not be the same as that needed to produce a screen of a different size. What is clear is that the number of elemental pictures across the entire screen must be the same in all theaters regardless of screen size. Assume, for example, that the standard for motion pictures (or slides) filmed in this process is that there would be 1,800 horizontal elemental pictures in the integral photograph. This would require that the screen should possess 1,800 holographic cylindrical zone plates across the entire screen regardless of screen size. The color focusing configuration would also be the same from screen to screen regardless of size. Therefore, in a twenty-foot wide screen, the individual zone plates would be 0.13 inch wide, while in a thirty-foot wide screen, the zone plates would each be 0.20 inch wide. Clearly, the tiles used to assemble a twenty-foot wide screen would not be the same as those use to assemble a thirty-foot wide screen.

3.0 The Surface Holographic Front Projection Screen (The Second Embodiment)

A hologram is actually a special purpose diffraction grating. It is normally created photographically by exposing a photographic emulsion on an appropriate substrate (a photographic plate) with two or more beams of coherent light from the same source. The holographic diffraction grating is set up in the emulsion once developed as the interference pattern between the various coherent light beams. One of the coherent light beams is referred to as the reference beam while the remaining coherent light beams are referred to as the object beams. During the process of holography (photographing the hologram), the reference beam is chosen as an easily reproducible light source, such as a spherical wavefront. Once developed, should the hologram be illuminated with a reference beam having approximately the same characteristics as the reference beam used to produce the hologram, the hologram will reconstruct all of the object beams. Therefore, a hologram may be thought of practically as an optical device that transforms one wavefront into another.

Figure 10A:
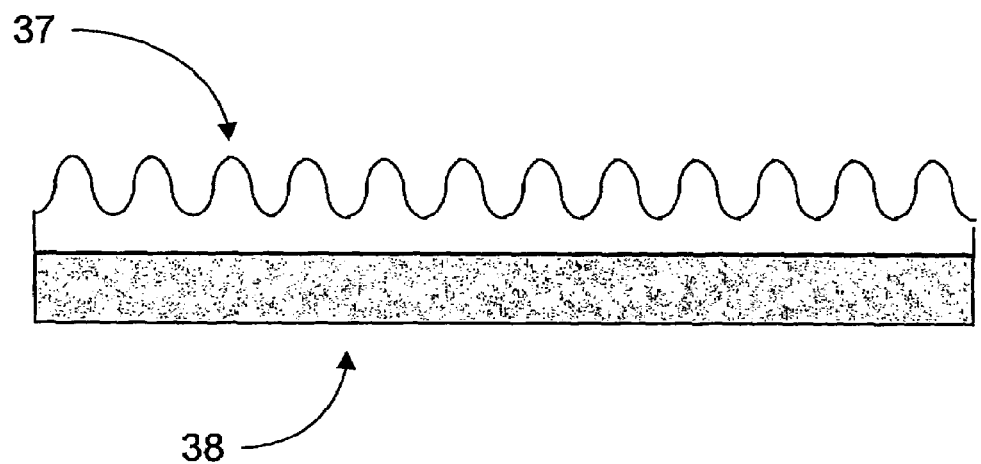
FIG. 10 contains cross sectional representations that illustrate the difference between a surface hologram and a volume hologram.
Figure 10B:
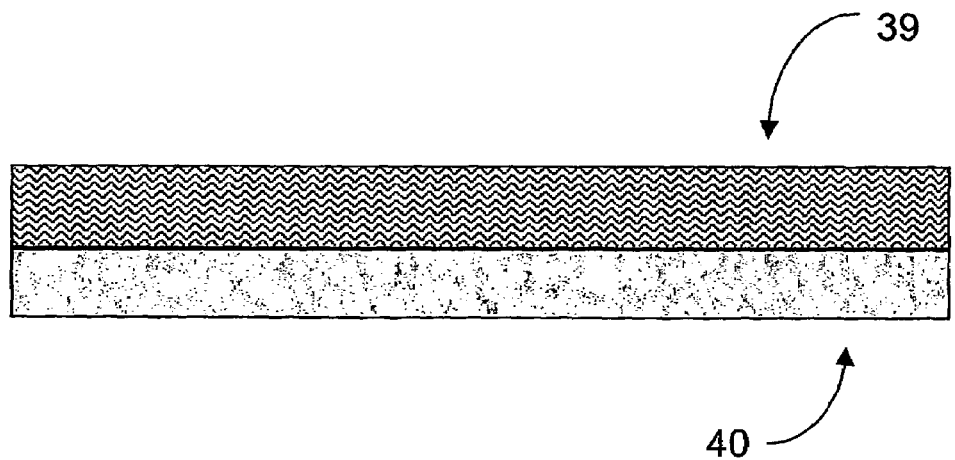

Two types of holograms can be produced photographically—the surface hologram and the volume hologram. Theses types of holograms are illustrated in FIG. 10. FIG. 10(a) shows a cross section of a surface hologram. Photographic emulsion 37 adheres to substrate 38. Once exposed and developed using photographic chemicals, emulsion 37 takes on the surface characteristics of a diffraction grating that can perform the above mention transformation of light impinging upon said surface of developed emulsion 37. FIG. 10(b) shows a cross section of a volume or Bragg Angle hologram. Photographic emulsion 39 adheres to substrate 40. Once exposed and developed using photographic chemicals, the diffraction grating characteristics appear throughout the volume of emulsion 39.

Figure 11:
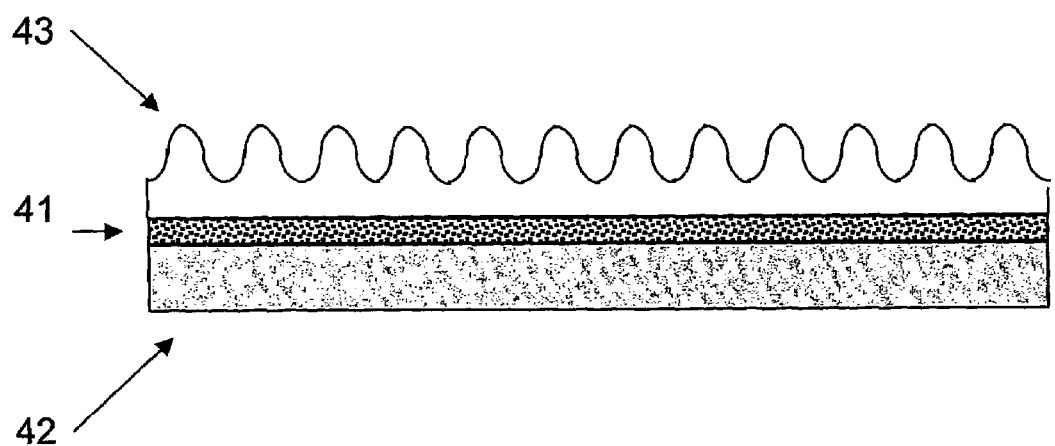
FIG. 11 is a cross sectional representation illustrating the makeup of a reflection surface hologram.

Volume holograms are normally reconstructed by reflection. The efficiency of wavefront reconstruction for a volume hologram is very high. Therefore, they are ideal for use as front projection screens. On the other hand, surface holograms are normally reconstructed by transmission. The efficiency of wavefront reconstruction for surface holograms is normally lower than that for volume holograms. However, surface holograms can be made into high efficiency reflection holograms by deposition of a reflective coating. The reflective coating may be deposited either on the front or the rear of the emulsion. However, deposition of the coating on the front of the emulsion could degrade the wavefront reconstruction. So, ideally, the reflective coating should be applied to the rear of the emulsion prior to exposure. FIG. 11 shows a cross section of a surface reflective hologram so produced. It is manufactured as follows. Reflective coating 41 is deposited onto substrate 42 prior to application of the emulsion 43. The emulsion should be thin enough to minimize optical abberations. Once developed, and illuminated with a reference beam from the front side, the reconstruction of the image will take place in front of the hologram.

The disadvantage of a holographic screen of this type for the reconstruction of full color three dimensional images from black and white integral photographs is that color filtration or synthesis is required. This can be accomplished in one of two ways. A color filter with alternating colors can be place in front of the screen. Alternatively, colored reflective coatings can be deposited on the substrate in sections in the appropriate pattern. This is a state of the art technique that uses masks to permit the coatings to be vacuum deposited on a substrate in certain places selectively.

The advantage of a holographic screen of this type is that this type of hologram may be mass produced by a process of stamping. Once the initial hologram is produced photographically, this hologram becomes the master used to produced a metal plate. Subsequent holograms may be produced by stamping the pattern from the master plate onto a plastic material. The plastic material can either be rigid or flexible. The reflective coatings disclosed above may then be deposited on the rear surface of the plastic material. If a color coating pattern is not deposited on the plastic, then a color filter having the appropriate color pattern must be placed in front of the screen.

This type of holographic screen may also be manufactured as tiles of rigid plastic. The tiles may then be assembled later to produce a screen of any desired size. Alternatively, the screen may be stamped continuously onto a roll of flexible plastic material. Such a screen is then cut to size and is affixed to a rigid member in order to produce the theater screen.

4.0 The Concave Element Front Projection Reflective Screen (The Third Embodiment)

Figure 12A:
FIG. 12 is a representation of the concave front projection screen wherein the elemental lenses form a rectangular matrix lens array.
Figure 12B:
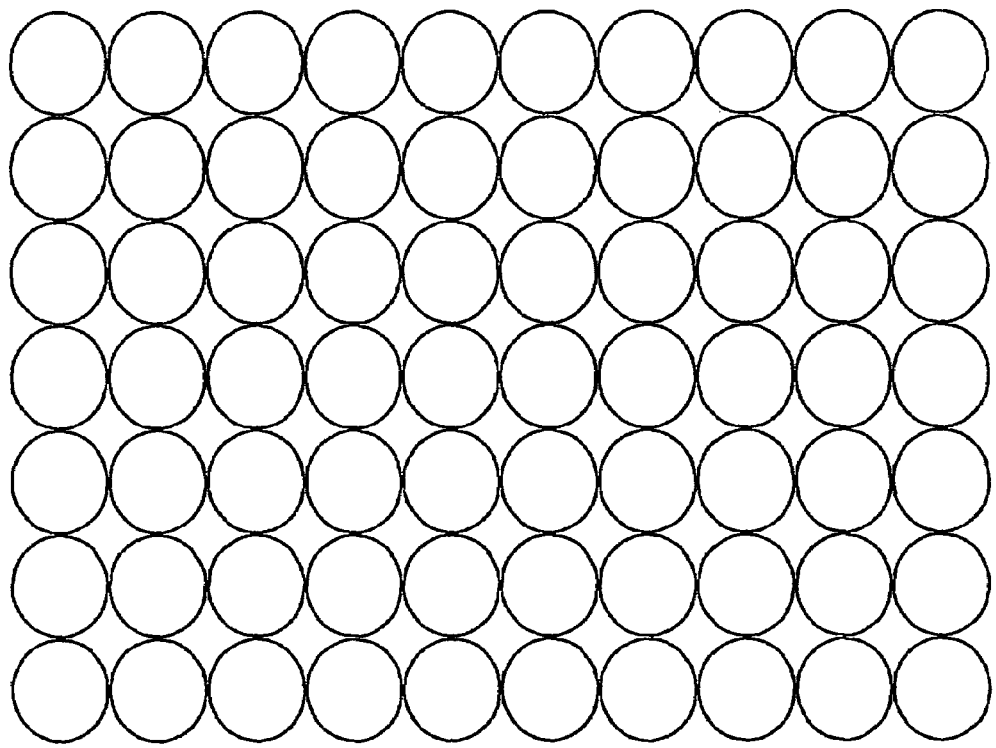
Figure 13A:
FIG. 13 is a representation of the concave front projection screen wherein the elemental lenses are arranged in a linear array so as to facilitate the elimination of vertical parallax.
Figure 13B:
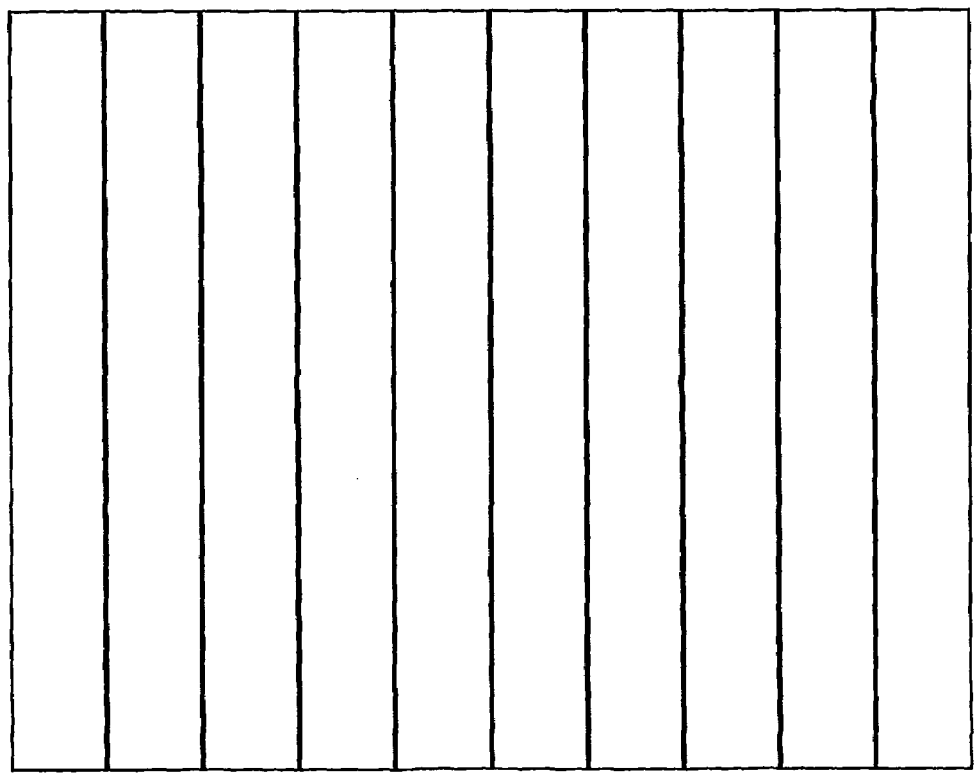
Figure 14:
FIG. 14 is a representation of the concave front projection screen of FIG. 13 wherein the elemental lenses have a parabolic cross section.
Figure 14:
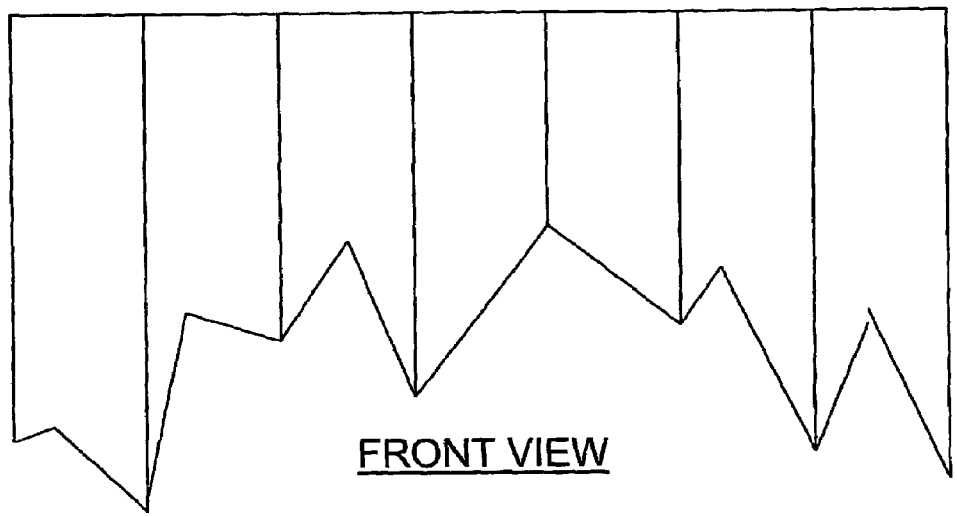

A non-holographic front projection screen for reconstruction of three-dimensional images from projected two-dimensional integral photographs is a matrix lens array of concave reflective elements. The screen may be a matrix lens array of concave spheres, concave paraboloids, concave ellipsoids, concave hyperboloids, or any other concave elements that inherently possess a focal point. This is shown in FIG. 12. FIG. 12(a) is a cross sectional view of the screen, while FIG. 12(b) is a front view of the screen. Alternatively, where it is desirable to eliminate vertical parallax, cylindrical elements should be used. This is shown in FIG. 13. FIG. 13(a) is a cross sectional view of the screen, while FIG. 13(b) is a front view of the screen. It should be noted that FIG. 13(a) is identical to FIG. 12(a). Such a screen is a linear array of concave cylinders whose front surfaces may be circular, parabolic, elliptical, hyperbolical, or any other curved surface that inherently possesses a focal point. FIG. 14 shows a schematic of a cylindrical screen wherein the cross sections of the concave elements are parabolic.

The screens of FIGS. 12 and 13 must have a reflective coating deposited upon the front surfaces of all the concave elements. The reflective coatings may be colored or not, but if said reflective coatings are not colored, a color filter must be placed in front of the screen. The screens of FIGS. 12 and 13 may also be manufactured in sections as tiles and assembled to a theater screen of any desired size with the restriction that the size of the individual concave elements will be different for different size screens.

5.0 Summary of the Various Screen and Tile Configurations

The following summary of screen configurations should enable one involved with the technology to better understand the invention:

TABLE 5.1

| Designation | Holographic or Concave | Reflective Coating | Color Filter | Color Scheme |
|---|---|---|---|---|
| VNNA | Volume | No | No | Additive |
| SUYA | Surface | Uncolored | Yes | Additive |
| SUYS | Surface | Uncolored | Yes | Subtractive |
| SUY2 | Surface | Uncolored | Yes | Two-Color |

TABLE 5.1-continued

| Designation | Holographic or Concave | Reflective Coating | Color Filter | Color Scheme |
|---|---|---|---|---|
| SCNA | Surface | Colored | No | Additive |
| SCNS | Surface | Colored | No | Subtractive |
| SCN2 | Surface | Colored | No | Two-Color |
| CUYA | Concave | Uncolored | Yes | Additive |
| CUYS | Concave | Uncolored | Yes | Subtractive |
| CUY2 | Concave | Uncolored | Yes | Two-Color |
| CCNA | Concave | Colored | No | Additive |
| CCNS | Concave | Colored | No | Subtractive |
| CCN2 | Concave | Colored | No | Two-Color |

There are four elements to be considered when speaking about screen types.
   Is the screen a hologram or is it a concave element focusing device?
      ⇒If it is a hologram, is it a Bragg Angle volume type hologram or is it a surface type hologram?
   Is a deposited reflective coating used?
      ⇒If a reflective coating is deposited, is it colored or uncolored?
   Are color filters used? (Color filters are never used when a colored reflected coating is applied.)
   Three different color schemes are used:
      ⇒ADDITIVE—Three or more primary colors are used which add together to form white light. The most commonly used additive primary colors are red, green, and blue. These three colors alternate so as to match the filters used to photograph the scene.
      ⇒SUBTRACTIVE—Three or more filters or deposited coatings are used two subtract the primary additive colors from white light. The most commonly used subtractive primary colors are cyan, magenta, and yellow. Cyan is white minus red; magenta is white minus green; and, yellow is white minus blue. These three colors alternate so as to match the filters used to photograph the scene.
      ⇒TWO-COLOR—A primary additive color is used alternating with its subtractive color. An example of this would be to use alternating red and cyan color swatches or strips. These two colors alternate so as to match the filters used to photograph the scene.
Every screen type can thus possess a four character alphanumeric designation:
First Character=Holographic or Concave
   V=Volume (Bragg Angle) Hologram
   S=Surface Reflective Hologram
   C=Concave Elements (Non-Holographic)
Second Character=Is a Reflective Coating Used?
   N=No
   U=Yes! Uncolored (or Silver) Coating is used
   C=Yes! Colored Reflective Coating is used
Third Character=Is a Color Filter Used?
   Y=Yes
   N=No
Fourth Character=What is the Color Scheme?
   A=Additive
   S=Subtractive
   2=Two-Color
Therefore each screen will be referred to by the four letter designation for the purpose of defining the invention. For example, the screen labeled VNNA is a Bragg Angle holographic screen with no reflective coating and no color filtration and having an additive color scheme. Every screen disclosed thus far may be comprised of manufactured tiles, wherein the complete screen is formed by assembly of a matrix of tiles. Since the tiles have the same properties as the screens that they assemble into, tiles will also be referred to by the four letter designation for the purpose of defining the invention.

Tiles would be manufactured as complete assemblies. For example, tiles for screen SUYA would be manufactured as concave surfaces having a silvered front surface with a color filter laminated to the front surface of the tile. Therefore, when the complete theater screen is assembled, the only component parts are the tiles themselves and the rigid structure upon which the tiles are mounted.

Description of the Best Mode for Carrying Out the Invention

This application specifically discloses screens that reconstruct a three-dimensional image from a projected two-dimensional integral photograph. The system consists of a first active optical system used to photograph a three-dimensional scene and to create a two-dimensional integral photograph therefrom, a means to magnify the two-dimensional integral photograph, and a second active optical system used to reconstruct a magnified three-dimensional scene from said magnified two-dimensional integral photograph. The screens described herein are meant to serve as said second active optical system.

Recording three-dimensional scenes as two-dimensional integral photographs requires dealing with extensive amounts of information, a whole order of magnitude greater than that required for standard two-dimensional photography. In order to practically construct the system disclosed in the '562 patent, the optical resolution of the medium upon which the images are captured as well as the ability to store such vast amounts of information must be considered. Therefore, any technical scheme that would reduce the amount of information to be recorded or that would increase the capacity of the recording or storage medium would greatly enhance the utility of the invention.

Two such technical schemes become important for the construction of the system. First, vertical parallax must be eliminated. This greatly reduces the amount of information that must be captured and stored. When viewing three-dimensional scenes in a theater, vertical parallax is unnecessary. Second, the integral photographs should be comprised of elemental pictures that are monochromatic (i.e., black and white). The media and means for recording black and white pictures has a much higher optical resolution than the media and means for recording full color pictures. Furthermore, the amount of information that must be captured and stored is reduced by two-thirds.

Therefore, the preferred embodiments are those systems whose first and second active optical systems both eliminate vertical parallax. This means that of all of the embodiments presented herein, the best mode contemplated by the inventor herein is represented by those front projection screens that focus vertical lines of light in front of the screen upon the focal plane of the screen. The preferred embodiments are further restricted to those screens whose focused vertical lines alternate in colors corresponding to the color filters used in the system's camera to monochromatically photograph the three-dimensional scene. The preferred embodiments are further restricted to the three color additive scheme, and further to the use of alternating colors of red, green, and blue. The use of color filters with the screen could create brightness and abberation problems. Therefore, the preferred embodiments should be further restricted either to the Bragg Angle holographic screen (designation VNNA) or the concave cylindrical screen wherein alternating red, green, and blue reflective coatings are deposited on the front concave surfaces (designation CCNA).

The Bragg Angle holographic screen (VNNA) as well as the concave cylindrical screen (CCNA) are equally exemplary embodiments. The selection of the concave surfaces as being semi-circular, parabolic, elliptical, or hyperbolic is dependent upon characteristics not relating to the screen and more dependent on other design parameters. Therefore, selection of any of these surfaces would not affect the preferred consideration of the concave screen (CCNA).

I claim:

1. A screen comprising an image plane or surface and a plurality of optical elements in an arrangement to reconstruct a three-dimensional image from any of several two-dimensional integral photographs that are projected and essentially focused upon said plane or surface, each integral photograph consisting essentially of a plurality of two-dimensional elemental pictures equal in number to and in the same arrangement as the optical elements of the screen.

2. The screen of claim 1 wherein said image plane or surface and said plurality of optical elements comprises a plurality of tiles that are reflection-type holograms.

3. The screen of claim 2, wherein said tiles produce from a reference beam that is a spherical wave-front of white light, an object beam that is a series of alternating red, green, and blue vertical lines appearing in front of said screen.

4. The screen of claim 2 or 3 wherein said reflection-type hologram is a Bragg Angle volume hologram.

5. The screen of claim 2, wherein said reflection-type hologram is a surface hologram comprising a diffractive surface and a reflective surface so that light transmits through said diffractive surface and reflects off said reflective surface back through said diffractive surface.

6. The screen of claim 5, wherein the reflective surface is formed by an uncolored reflective coating, and further comprising a color filter of alternating colors affixed to the front surface of said tiles, wherein the alternating colors use an additive, subtactive, or two-color scheme to form white light.

7. The screen of claim 6, wherein said color filter affixed to said tiles has a repeating alternating series of red, green, and blue colors.

8. The screen of claim 5, wherein said reflective surface is colored using a reflective coating with alternating colors that use an additive, subtractive, or two-color scheme to form white light.

9. The screen of claim 8, wherein said reflective surface of each said tile has a repeating alternating series of red, green, and blue colors.

10. A method for the manufacture of the screen of claim 2, wherein said screen is assembled from tiles selected from the group consisting of:

a) tiles that are volume holograms that do not have a reflective coating, wherein no color filter is used and wherein they reconstruct white light from alternating colors using an additive color scheme;

b) tiles that are surface reflective holograms that have a reflective coating wherein a color filter is used to reconstruct white light from alternating colors using an additive color scheme;

c) tiles that are surface reflective holograms that have a reflective coating wherein a color filter is used to reconstruct white light from alternating colors using a subtractive color scheme;

d) tiles that are surface reflective holograms that have a reflective coating wherein a color filter is used to reconstruct white light from alternating colors using a two-color scheme;

e) tiles that are surface reflective holograms that use a colored reflective coating to reconstruct white light from alternating colors using an additive color scheme;

f) tiles that are surface reflective holograms that use a colored reflective coating to reconstruct white light from alternating colors using a subtractive color scheme;

g) tiles that are surface reflective holograms that use a colored reflective coating to reconstruct white light from alternating colors using a two-color scheme;

h) tiles consisting essentially of non-holographic concave elements having an uncolored reflective coating wherein a color filter is used to reconstruct white light from alternating colors using an additive color scheme;

i) tiles consisting essentially of non-holographic concave elements having an uncolored reflective coating wherein a color filter is used to reconstruct white light from alternating colors using a subtractive color scheme;

j) tiles consisting essentially of non-holographic concave elements having an uncolored reflective coating wherein a color filter is used to reconstruct white light from alternating colors using a two-color scheme;

k) tiles consisting essentially of non-holographic concave elements having a colored reflective coating so as to reconstruct white light from alternating colors using an additive color scheme;

l) tiles consisting essentially of non-holographic concave elements having a colored reflective coating so as to reconstruct white light from alternating colors using a subractive color scheme; and, m) tiles consisting essentially of non-holographic concave elements having a colored reflective coating so as to reconstruct white light from alternating colors using a two-color scheme.

11. The screen of claim 1 wherein said image plane or surface and said plurality of optical elements comprises a reflection-type hologram, and wherein said reflection-type hologram is produced on a flexible substrate of any desired size and wherein said flexible substrate is fastened or adhered to an essentially rigid backing.

12. The screen of claim 11, wherein said reflection-type hologram produces from a reference beam that is a spherical wave-front of white light, an object beam that is an alternating series of red, blue, and green vertical lines appearing in front of said screen.

13. The screen of claim 11 or 12, wherein said reflection-type hologram is a Bragg Angle volume hologram.

14. The screen of claim 11, wherein said reflection-type hologram is a surface hologram comprising a diffractive surface and a reflective surface so that light transmits through said diffractive surface and reflects off said reflective surface back through said diffractive surface.

15. The screen of claim 14, wherein said reflective surface is colored using a reflective coating with alternating colors that use an additive, subtractive, or two-color scheme to form white light.

16. The screen of claim 15, wherein the colors of said reflective surfaces of said screen have a repeating alternating series of red, green, and blue colors.

17. The screen of claim 1 comprising a plurality of concave reflective surfaces that focus light onto a focal plane in front of said screen.

18. The screen of claim 17, wherein each said concave reflective surface is a hemisphere, a paraboloid, a hyperboloid, or a portion of an ellipsoid.

19. The screen of claim 17, wherein each said concave reflective surface is aligned along the longitudinal direction.

20. The screen of claim 19, wherein the cross section of each said longitudinally aligned concave reflective surface is a semi-circle, a parabola, a hyperbola, or a portion of an ellipse.

21. The screen of claim 17, 18, 19, or 20, further comprising a plurality of alternating color filters that produce monochromatic light output from a white light input, wherein the alternating colors use an additive, subtactive, or two-color scheme to form white light.

22. The screen of claim 21, wherein the color filters consist of alternating red, green, and blue colors.

23. The screen of claim 21, wherein the color filters consist of alternating cyan, magenta, and yellow colors.

24. The screen of claim 21, wherein the color filters consist of alternating red and cyan colors.

25. The screen of claim 21, wherein the color filters consist of alternating green and magenta colors.

26. The screen of claim 21, wherein the color filters consist of alternating blue and yellow colors.

27. The screen of claim 17, 18, 19, or 20, wherein said reflective surfaces are colored using a reflective coating with alternating colors that use an additive, subtractive, or two-color scheme to form white light.

28. The screen of claim 27, wherein said reflective surfaces are colored using alternating red, green, and blue colors.

29. The screen of claim 27, wherein said reflective surfaces are colored using alternating cyan, magenta, and yellow colors.

30. The screen of claim 27, wherein said reflective surfaces are colored using alternating red and cyan colors.

31. The screen of claim 27, wherein said reflective surfaces are colored using alternating green and magenta colors.

32. The screen of claim 27, wherein said reflective surfaces are colored using alternating blue and yellow colors.

33. The screen of claim 1 wherein said screen comprises a plurality of tiles each having a front surface comprised of a plurality of concave reflective surfaces capable of focusing light onto a focal plane in front of the tile.

34. A tile for use in the screen of claim 33, said tile having a front surface comprised of a plurality of concave reflective surfaces capable of focusing light onto a focal plane in front of the tile.

35. The tile of claim 34, wherein each said concave reflective surface is a hemisphere, a paraboloid, a hyperboloid, or a portion of an ellipsoid.

36. The tile of claim 34, wherein each said concave reflective surface is aligned along the longitudinal direction.

37. The tile of claim 36, wherein the cross section of each said longitudinally aligned concave reflective surface is a semi-circle, a parabola, a hyperbola, or a portion of an ellipse.

38. The tile of claim 34, 35, 36, or 37, further comprising an alternating series of color filters that produce monochromatic light output from a white light input, wherein the alternating colors use an additive, subtractive, or two-color scheme to form white light.

39. The tile of claim 38, wherein the color filters consist of an alternating series of red, green, and blue filters.

40. The tile of claim 38, wherein the color filters consist of an alternating series of cyan, magenta, and yellow filters.

41. The tile of claim 38, wherein the color filters consist of alternating red and cyan filters.

42. The tile of claim 38, wherein the color filters consist of alternating green and magenta filters.

43. The tile of claim 38, wherein the color filters consist of alternating blue and yellow filters.

44. The tile of claim 34, 35, 36, or 37, wherein said reflective surfaces are colored using a reflective coating with alternating colors that use an additive, subtractive, or two color scheme to form white light.

45. The tile of claim 44, wherein said reflective surfaces are colored using an alternating series of red, green, and blue colors.

46. The tile of claim 44, wherein said reflective surfaces are colored using an alternating series of cyan, magenta, and yellow colors.

47. The tile of claim 44, wherein said reflective surfaces are colored using alternating red and cyan colors.

48. The tile of claim 44, wherein said reflective surfaces are colored using alternating green and magenta colors.

49. The tile of claim 44, wherein said reflective surfaces are colored using alternating blue and yellow colors.

50. A system for recording and projecting images in substantially three-dimensional format comprising:

a camera that produces and records a plurality of two-dimensional elemental pictures that photographically represent a three-dimensional scene; and, a projector that images said plurality of elemental pictures; and, a screen that reconstructs a three-dimensional image from the plurality of elemental pictures;

wherein the improvement comprises the use of the screen of claim 1 that is selected from the group consisting of:

a) a screen comprised of volume holograms that do not have a reflective coating, wherein no color filter is used and that reconstruct white light from alternating colors using an additive color scheme;

b) a screen comprised of surface reflective holograms that have a reflective coating wherein a color filter is used to reconstruct white light from alternating colors using an additive color scheme;

c) a screen comprised of surface reflective holograms that have a reflective coating wherein a color filter is used to reconstruct white light from alternating colors using a subtractive color scheme;

d) a screen comprised of surface reflective holograms that have a reflective coating wherein a color filter is used to reconstruct white light from alternating colors using a two-color scheme;

e) a screen comprised of surface reflective holograms that use a colored reflective coating to reconstruct white light from alternating colors using an additive color scheme;

f) a screen comprised of surface reflective holograms that use a colored reflective coating to reconstruct white light from alternating colors using a subtractive color scheme;

g) a screen comprised of surface reflective holograms that use a colored reflective coating to reconstruct white light from alternating colors using a two-color scheme;

h) a screen consisting essentially of non-holographic concave elements having an uncolored reflective coating wherein a color filter is used to reconstruct white light from alternating colors using an additive color scheme;

i) a screen consisting essentially of non-holographic concave elements having an uncolored reflective coating wherein a color filter is used to reconstruct white light from alternating colors using a subtractive color scheme;

j) a screen consisting essentially of non-holographic concave elements having an uncolored reflective coating wherein a color filter is used to reconstruct white light from alternating colors using a two-color scheme;

k) a screen consisting essentially of non-holographic concave elements having a colored reflective coating so as to reconstruct white light from alternating colors using an additive color scheme;

l) a screen consisting essentially of non-holographic concave elements having a colored reflective coating so as to reconstruct white light from alternating colors using a subractive color scheme; and, m) a screen consisting essentially of non-holographic concave elements having a colored reflective coating so as to reconstruct white light from alternating colors using a two-color scheme.

51. The screen of claim 1 wherein the screen is a front projection screen.

52. The screen of claim 1 wherein the screen is a rear projection screen.

53. The screen of claim 1 wherein each element in said plurality of optical elements is a refractive lens.

54. The screen of claim 53 wherein each refractive lens is spherical.

55. The screen of claim 54 wherein the arrangement of lenses is hexagonally close packed.

56. The screen of claim 53 wherein each refractive lens is rectangular.

57. The screen of claim 53 wherein the arrangement of lenses is as a rectangular matrix.

58. The screen of claim 53 wherein said plurality of optical elements comprises a plurality of parallel cylindrical lenses, said adjacent lenses arranged horizontally such that each lens has its long axis oriented vertically.

59. The screen of claim 1 wherein each element in said plurality of optical elements is a reflective lens.

60. The screen of claim 59 wherein each reflective lens is concave.

61. The screen of claim 60 wherein the arrangement of lenses is hexagonally close packed.

62. The screen of claim 59 wherein each reflective lens is concave and spherical.

63. The screen of claim 59 wherein the arrangement of lenses is as a rectangular matrix.

64. The screen of claim 63 wherein the outer boundaries of said lenses are rectangles such that when placed adjacent to each other, wasted space is eliminated.

65. The screen of claim 59 wherein said plurality of optical elements comprises crossed parallel concave cylindrical lenses.

66. The screen of claim 59 wherein said plurality of optical elements comprises a plurality of parallel concave cylindrical lenses, said adjacent lenses arranged horizontally such that each lens has its long axis oriented vertically.

67. The screen of claim 59 wherein said plurality of optical elements is a Fresnel zone lens.

68. The screen of claim 67 wherein the arrangement of Fresnel zone lenses is hexagonally close packed.

69. The screen of claim 67 wherein each Fresnel zone lens is circular.

70. The screen of claim 67 wherein each Fresnel zone lens is rectangular.

71. The screen of claim 67 wherein the arrangement of Fresnel zone lenses is as a rectangular matrix.

72. The screen of claim 67 wherein said plurality of optical elements comprises a plurality of parallel Fresnel zone cylindrical lenses such that each lens has its long axis oriented vertically.

73. The screen of claim 59 wherein said plurality of optical elements is a Gabor zone lens.

74. The screen of claim 73 wherein the arrangement of Gabor zone lenses is hexagonally close packed.

75. The screen of claim 73 wherein each Gabor zone lens is circular.

76. The screen of claim 73 wherein each Gabor zone lens is rectangular.

77. The screen of claim 73 wherein the arrangement of Gabor zone lenses is as a rectangular matrix.

78. The screen of claim 72 wherein said plurality of optical elements comprises a plurality of parallel Gabor zone cylindrical lenses such that each lens has its long axis oriented vertically.

79. The screen of claim 1 wherein each element of said plurality of optical elements is a hologram.

80. The screen of claim 79 wherein each said hologram is a transmission hologram.

81. The screen of claim 79 wherein each said hologram is a reflection hologram.

82. The screen of claim 81 wherein each said hologram is a Bragg Angle reflection hologram.

83. The screen of claim 81 wherein each said hologram is a surface hologram comprising a diffractive surface and a reflective surface so that light transmit through said diffractive surface and reflects off said reflective surface back through said diffractive surface.

84. The screen of claim 83 further comprising color filters that are an alternating series of primary colors affixed to the front surface of said plurality of holograms.

85. The screen of claim 84 said primary colors are red, green, and blue.

* * * * *